(12) United States Patent
Green

(10) Patent No.: US 12,530,913 B2
(45) Date of Patent: Jan. 20, 2026

(54) QUALIFYING LABELS AUTOMATICALLY ATTRIBUTED TO CONTENT IN IMAGES

(71) Applicant: Sony Interactive Entertainment Inc., Tokyo (JP)

(72) Inventor: Arran Green, La Mesa, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 418 days.

(21) Appl. No.: 18/171,256

(22) Filed: Feb. 17, 2023

(65) Prior Publication Data

US 2024/0282130 A1    Aug. 22, 2024

(51) Int. Cl.
| | |
|---|---|
| *G06V 20/70* | (2022.01) |
| *G06F 3/0482* | (2013.01) |
| *G06F 3/16* | (2006.01) |
| *G06T 7/70* | (2017.01) |
| *G06T 17/00* | (2006.01) |
| *G06V 10/44* | (2022.01) |
| *G06V 10/764* | (2022.01) |

(52) U.S. Cl.
CPC ............ *G06V 20/70* (2022.01); *G06F 3/0482* (2013.01); *G06F 3/167* (2013.01); *G06T 7/70* (2017.01); *G06T 17/00* (2013.01); *G06V 10/44* (2022.01); *G06V 10/764* (2022.01); *G06V 2201/07* (2022.01)

(58) Field of Classification Search
CPC ...... G06V 20/70; G06V 10/44; G06V 10/764; G06F 3/0482; G06F 3/16; G06F 3/167; G06T 17/00; G06T 7/70
USPC ......................................................... 382/224
See application file for complete search history.

(56) References Cited

U.S. PATENT DOCUMENTS

| | | | |
|---|---|---|---|
| 10,551,845 B1* | 2/2020 | Kim | G06F 18/214 |
| 10,732,783 B2* | 8/2020 | Yang | G06F 16/583 |
| 11,361,018 B2* | 6/2022 | Gulati | G06F 16/54 |
| 2017/0185236 A1* | 6/2017 | Yang | H04L 51/02 |
| 2019/0163768 A1* | 5/2019 | Gulati | G06F 16/56 |

(Continued)

FOREIGN PATENT DOCUMENTS

CN     114880441 B     2/2023

OTHER PUBLICATIONS

ISR WO PCT/US2024/015595, dated May 27, 2024, Total 12 pages.

(Continued)

*Primary Examiner* — William D Titcomb
(74) *Attorney, Agent, or Firm* — Kilpatrick Townsend & Stockton LLP

(57) ABSTRACT

A method for image generation. The method including identifying a plurality of features of an image. The method including classifying each of the plurality of features using an artificial intelligence (AI) model trained to identify features in a plurality of images, wherein the plurality of features is classified as a plurality of labels, wherein the image is provided as input to the AI model. The method including receiving feedback for a label, wherein the feedback is associated with a user. The method including modifying a label based on the feedback. The method including updating the plurality of labels with the label that is modified. The method including providing as input the plurality of labels that is updated into an image generation artificial intelligence system configured for implementing latent diffusion to generate an updated image.

20 Claims, 10 Drawing Sheets

(56) References Cited

U.S. PATENT DOCUMENTS

2020/0272862 A1* 8/2020 Gardner .............. G06V 20/10
2021/0232872 A1* 7/2021 Ries .............. G06V 30/19173

OTHER PUBLICATIONS

Robin Rombach et al.: "High-Resolution Image Synthesis with Latent Diffusion Models", Jun. 1, 2022 (Jun. 1, 2022), Ludwig Maximillian University of Munich, XP0034194085, pp. 1-45, cited in the application the whole document.
Ramesh Aditya et al.: DALL.E: Creating images from text:, Jan. 5, 2021 (Jan. 5, 2021), pp. 1-18, XP093134452, Retrieved from the Internet: URL:https://openai.com/research/dall-e [retrieved on Feb. 23, 2024] the whole document.

* cited by examiner

QUALIFYING LABELS AUTOMATICALLY ATTRIBUTED TO CONTENT IN IMAGES

TECHNICAL FIELD

The present disclosure is related to image generation, such as during development of a video game, and more specifically to enabling modification to an image using an image generation artificial intelligence model implementing latent diffusion techniques based on editing of one or more labeled features of the image.

BACKGROUND OF THE DISCLOSURE

Video games and/or gaming applications and their related industries (e.g., video gaming) are extremely popular and represent a large percentage of the worldwide entertainment market. Development of video games involves the generation of one or more images in sequential order, wherein the images are set within a scene of a particular video game. Developing each scene may involve many steps to identify and create objects within the scene, and may further involve movement of the objects within the scene throughout multiple images. Each object may include intricate characteristics that define that object. For example, characteristics of an object may include size, shape, color, surface makeup, etc.

After an image or images of a scene have been developed, making changes to the characteristics of an object may also involve many intricate steps. For instance, the developer may have to individually change parameters of characteristics of an object that are changed, which can be time consuming, especially when those parameters are not readily available. Further, the change reflected in one object may not be consistent with other objects within the scene that is not changed. Additionally, it is difficult to make wholesale changes to a scene without redrawing the image from scratch. For example, wholesale changes to a scene may include changing an entire environment of the scene or changing a characteristic of the environment that would affect the entire scene or all the objects within the scene. In those cases, making a change to the environment would require redeveloping one or more images for the scene.

It is in this context that embodiments of the disclosure arise.

SUMMARY

Embodiments of the present disclosure relate to image generation, such as during development of a video game, wherein a modified image is generated using an artificial intelligence (AI) model, such as an image generation artificial intelligence (IGAI) model, implementing latent diffusion techniques. More specifically, modifications to an image are enabled via editing of labeled features of the image, wherein the modified image is generated using an IGAI model implementing latent diffusion based on the labeled features of the image that are modified and/or unmodified.

In one embodiment, a method for image generation is disclosed. The method including identifying a plurality of features of an image. The method including classifying each of the plurality of features using an artificial intelligence (AI) model trained to classify features in a plurality of images, wherein the plurality of features is classified as a plurality of labels, wherein the image is provided as input to the AI model. The method including receiving feedback for a label, wherein the feedback is associated with a user. The method including modifying a label based on the feedback. The method including updating the plurality of labels with the label that is modified. The method including providing as input the plurality of labels that is updated into an image generation artificial intelligence system configured for implementing latent diffusion to generate an updated image.

In another embodiment, a non-transitory computer-readable medium storing a computer program for implementing a method is disclosed. The computer-readable medium including program instructions for identifying a plurality of features of an image. The computer-readable medium including program instructions for classifying each of the plurality of features using an artificial intelligence (AI) model trained to classify features in a plurality of images, wherein the plurality of features is classified as a plurality of labels, wherein the image is provided as input to the AI model. The computer-readable medium including program instructions for receiving feedback for a label, wherein the feedback is associated with a user. The computer-readable medium including program instructions for modifying a label based on the feedback. The computer-readable medium including program instructions for updating the plurality of labels with the label that is modified. The computer-readable medium including program instructions for providing as input the plurality of labels that is updated into an image generation artificial intelligence system configured for implementing latent diffusion to generate an updated image.

In still another embodiment, a computer system is disclosed, wherein the computer system includes a processor and memory coupled to the processor and having stored therein instructions that, if executed by the computer system, cause the computer system to execute a method. The method including identifying a plurality of features of an image. The method including classifying each of the plurality of features using an artificial intelligence (AI) model trained to classify features in a plurality of images, wherein the plurality of features is classified as a plurality of labels, wherein the image is provided as input to the AI model. The method including receiving feedback for a label, wherein the feedback is associated with a user. The method including modifying a label based on the feedback. The method including updating the plurality of labels with the label that is modified. The method including providing as input the plurality of labels that is updated into an image generation artificial intelligence system configured for implementing latent diffusion to generate an updated image.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
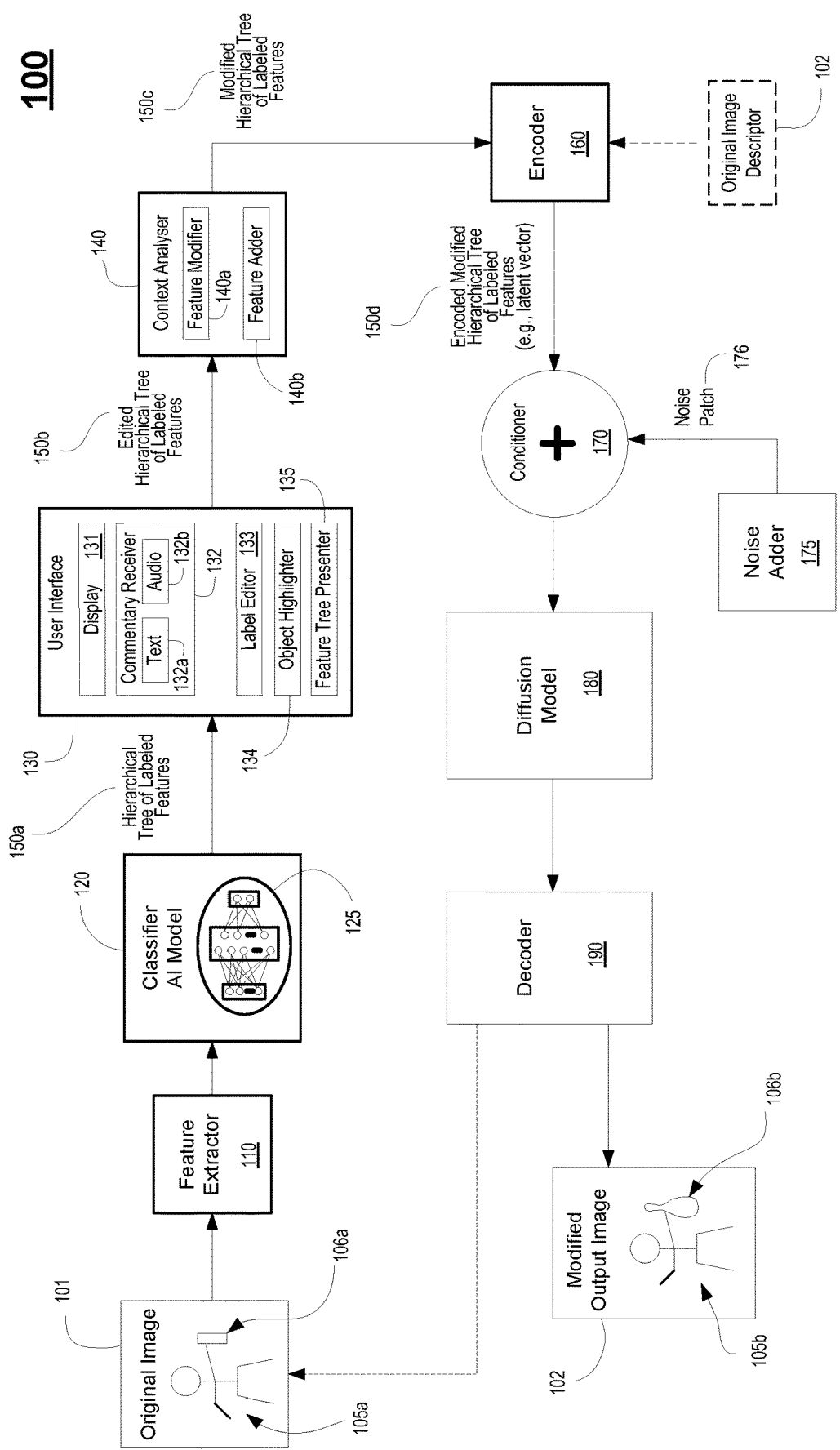
FIG. 1A illustrates a system configured for editing of labeled features of an image and generating a modified image using an image generation artificial intelligence model implementing latent diffusion techniques based on the labeled features of the image that are modified or unmodified, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe systems and methods providing for the modification of an image using an artificial intelligence (AI) generation model implementing latent diffusion techniques based on editing of one or more labeled features of the image that are modified and/or unmodified. In particular, an image can be analyzed to identify features, and be further analyzed to determine attributes for those features. The attributes can be related to what is present in the image, such as the coloring, lighting, people, buildings, scenery, objects, themes, etc. In one embodiment, the attributes can be automatically labeled, such as by using an AI model to classify the features with labels. In addition, a user interface (UI) is configured to allow for editing of one or more labels corresponding to the different attributes or features of the image. The classified labels of the image, including labels that have been edited and/or modified, are provided as input to an IGAI model to generate a modified image. Also, the UI is configured to allow a user to selectively comment (e.g., in natural language) on one or more labels corresponding to the different features and/or attributes of the image. That is, the user is allowed to rate the classified labels of the image, wherein the ratings provide user feedback on the image. For example, the user can like or dislike the attributes or labels (e.g., a thumbs up or thumbs down communication), or can provide commentary describing the like or dislike of attributes or labels. The feedback is a type of tuning that allows the user to force or guide image generation to a specific desired outcome. Further, label ratings can be collected from the user, or more than one user if the image is examined, rated, or commented upon by more than one user as in a crowd sourcing environment. These label ratings can be utilized by the IGAI model to dynamically generate a modified image using the labels, edits to the labels, and/or commentary regarding the labels.

Advantages of embodiments of the present disclosure include providing an intuitive way to change an image via a user interface that is configured to enable editing of one or more labeled features of the image, wherein the features are automatically labeled using an AI model, to receive user input as feedback. The user is able to view an effect of the editing on the image when the labeled features of the image, including labels that have been edited and/or modified, are provided as input to an IGAI model to generate a modified image. In addition, other advantages include reducing the time to make a change to an image, or to a sequence of images of a scene within a video game under development. That is, the IGAI model is configured to accept modifications to the image via edited labels from labels that are automatically classified from identified features of the image. For example, modifications to an image can be quickly generated, while maintaining the heart of the image as originally presented. That is, the modified image provides a believable and true evolution of the original image. Another advantage provides for cascading a change of a portion of the image throughout the remaining portions of the image. Specifically, a modification to a labeled feature may affect other labels as identified through further analysis, such that all affected labels are further modified to be in alignment with the initial modification to the labeled feature. The labeled features of the image, including all the modified labels, are provided as input to the IGAI model to generate the modified image.

Throughout the specification, the reference to "game" or "video game" or "gaming application" is meant to represent any type of interactive application that is directed through execution of input commands. For illustration purposes only, an interactive application includes applications for gaming, word processing, video processing, video game processing, etc. Also, the terms "virtual world" or "virtual environment" or "metaverse" is meant to represent any type of environment generated by a corresponding application or applications for interaction between a plurality of users in a multi-player session or multi-player gaming session. Further, the terms introduced above are interchangeable.

With the above general understanding of the various embodiments, example details of the embodiments will now be described with reference to the various drawings.

FIG. 1A illustrates a system 100 configured for editing of labeled features of an image and generating a modified image using an IGAI model implementing latent diffusion techniques based on the labeled features of the image, including labels that have been modified, in accordance with one embodiment of the present disclosure. In that manner, a user is able to quickly edit labeled features of an image and immediately visually see the effect of those edits when a modified image is generated using an IGAI model based on the features of the image that have been labeled through classification by an AI model, including labeled features that have been modified. For example, system 100 may be implemented during development of a video game, such as when developing one or more images of a scene System 100 is configured to enable a user to modify an original image 101 that may be generated through a variety of methods. For example, the image 101 may be a digital image, or an analog image that has been digitized. As shown, the image 101 may include a person 105*a* holding an object 106*a* (e.g., a soda can). The person 105*a* may be in a first orientation for holding the can 106*a*, wherein the arm of the person not holding the can is orientated downwards. In some embodiments, the image 101 may have been generated using an IGAI model implementing latent diffusion in response to user input (e.g., description of a desired image, such as descriptor 102 that is encoded into a latent space vector). Modifications to the original image 101 can be iteratively performed to reach a desired result, wherein at each iteration a newly modified image can be generated by an IGAI model implementing latent discussion based on features in an image (i.e., an initial image or an image generated and/or modified in the last iteration) that have been automatically classified (e.g., labeled), including the editing of one or more features by the user in the current iteration.

Figure 1B:
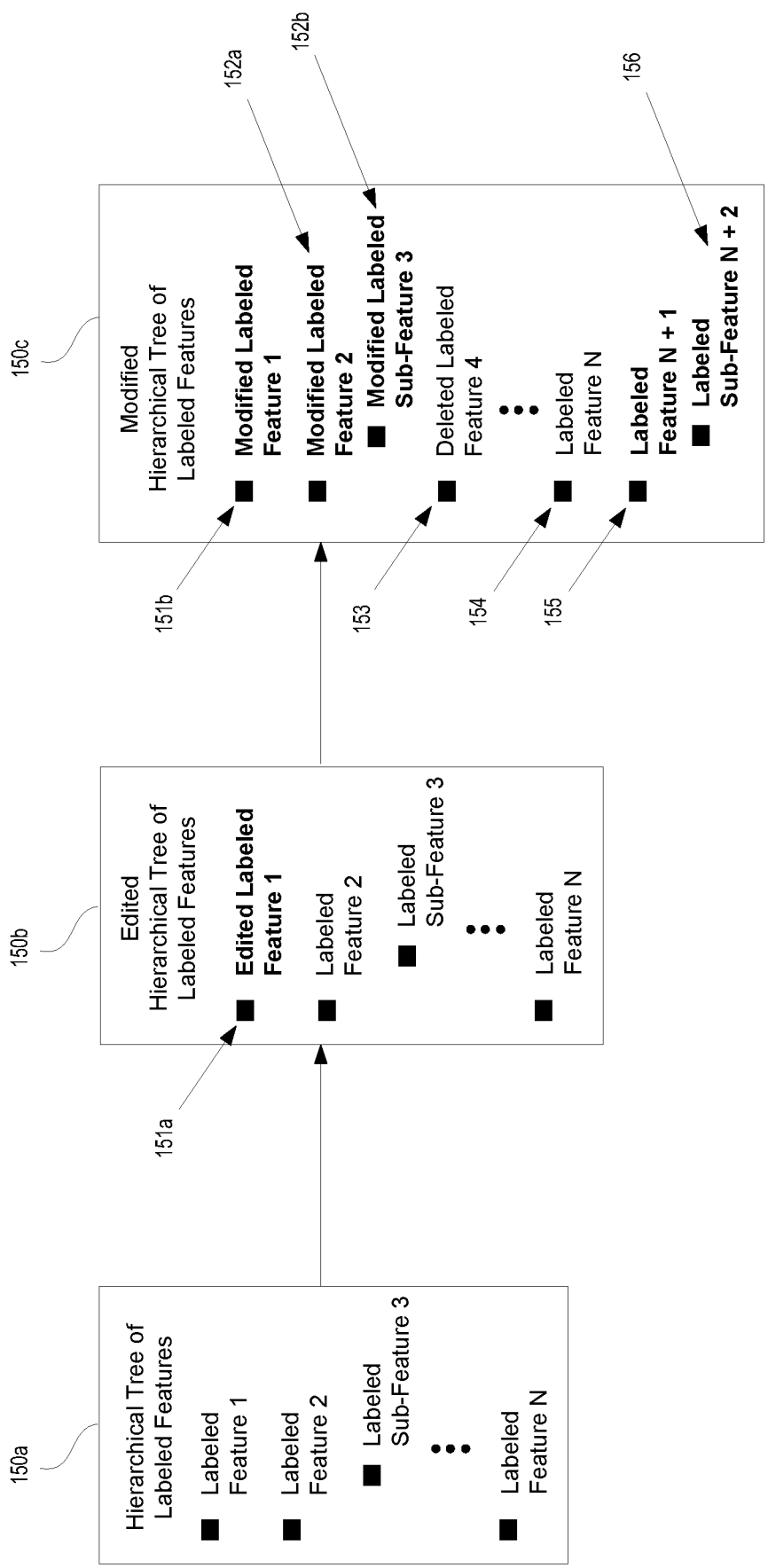
FIG. 1B illustrates various stages of a hierarchical tree of labeled features for an image that is modified via editing of labeled features of the image, in accordance with one embodiment of the present disclosure.

In particular, the original image 101 is analyzed by the feature extractor 110 that is configured to extract features that have been previously learned, wherein the extracted features are relevant to generating images. In addition, the classifier 120 is configured to classify and/or label the extracted features. Purely for illustration, the classifier 120 may be configured as an AI model executed by a deep/machine learning engine that may be configured as a neural network 125. In some embodiments, the feature extractor 110 and classifier 120 are implemented within one or more AI models. For example, the classifier 120 is configured to output a hierarchical tree of labeled features 150*a* for the original image 101, wherein the labeled features can be used by an IGAI model (e.g., as input useful for generating another image). FIG. 1B illustrates an exemplary hierarchical tree 150*a* including labeled features 1 though N, wherein each of the features can be nested with other features (e.g., features, sub-features, sub-sub-features, etc.).

An AI model (e.g., classifier 120) may be trained using training data provided as input to a matching learning system, which implements a training algorithm to fit the structure of the AI model to the training data by tweaking parameters of the AI model so that the trained AI model provides an accurate relationship between input (training data) and output (e.g., labeled features relevant to images). Training and/or learning may be supervised using known and true outputs (e.g., known labels of features of objects) associated with the training data (objects found in images). Training and/or learning may be unsupervised, wherein no know or true outputs are provided for the training data, such that input data is only provided (e.g., images, objects, etc.) and the AI model learns to classify features found in images (i.e., to determine appropriate labels for those features). Also, training may implement both supervised and unsupervised training. For example, after performing unsupervised training, supervised learning may be performed with known data. As such, the neural network 125 in the machine learning engine is configured to build the classier AI model 120 that is configured to classify and/or label features that are relevant for generating an image using an IGAI implementing latent diffusion.

Generally, the neural network in an AI model represents a network of interconnected nodes responding to input (e.g., extracted features) and generating an output (e.g., labeled features suitable for building an image through an IGAI model). In one embodiment, the neural network 125 includes a hierarchy of nodes, including an input layer, an output layer, and intermediate or hidden layers. Input nodes are interconnected to hidden nodes in the hidden layers, and hidden nodes are interconnected to output nodes. Interconnections between nodes may have numerical weights that may be used to link multiple nodes together between an input and output, such as when defining rules of the classifier 120. For example, the AI model is configured to apply rules defining relationships between features and outputs, wherein features may be defined within one or more nodes that are located at one or more hierarchical levels of the AI model. The rules link features (e.g., as defined by nodes) between the layers of the hierarchy of nodes, such that a given input set of data leads to a particular output (e.g., labeled features relevant to images). For example, a rule may link (e.g., using relationship parameters including weights) one or more features and/or nodes through the AI model (e.g., in the hierarchical levels) between an input and an output, such that one or more features make a rule that can be learned through training of the AI model. That is, each feature may be linked with other features in other layers, wherein relationship parameters (e.g., weights) define interconnections between features at other layers in the AI model, wherein each rule or set of rules corresponds to a classified output (e.g., labeled feature relevant to an image). As such, the classier AI model 120 that is trained can be implemented to classify and/or label features that are relevant for generating an image using an IGAI implementing latent diffusion.

As shown, a user interface 130 is configured to facilitate implementing changes to an image 101 based on user feedback. In particular, the user interface may include a display 131 configured for displaying an interface for purposes of facilitating interaction with a user, and the original image 101 and/or the modified image 102.

The user interface may include a commentary receiver 132 configured to receive commentary and/or input from a user made in relation to viewing the original image 101. For example, the commentary from the user may be to—"change the soda can to a glass bottle." In particular, the commentary receiver 132 may include a text receiver 132*a* configured to receive text commentary from the user, and/or an audio receiver 132*b* that is configured to receive audio commentary from the user. Other interfaces are supported, including a like or dislike receiver, etc. Commentary receiver 132 may be configured in any manner to receive and/or recognize commentary provided by the user. In that manner, the commentary receiver provides an intuitive way for the user to provide input or feedback regarding the original image 101, such as through voice, text, or via simple like and/or dislike communication icons.

In addition, the user interface 130 may include an object highlighter 134 configured for highlighting and/or selecting a specific portion of the image (e.g., an object) towards which the user is directing feedback. For purposes of illustration, the highlighter 134 may be controller, text, or audio driven, or driven through any suitable means for purposes of selecting an object or feature of an image being presented in display 131. In that manner, the user may provide feedback (e.g., edits to labeled features) specifically directed to an object, or parameter, or characteristic, etc. of the image 101.

The user interface 130 may also include a feature tree presenter 135 configured for generating a feature tree for display. For example, the hierarchical tree of labeled features 150*a* associated with the image 101 may be presented in display 131. In addition, any other versions of the hierarchical tree (e.g., 150*a*, 150*b*, 150*c*, etc.) may be presented by the feature tree presenter 135 on display 131.

Further, the user interface 130 may include a label editor 133 that is configured to allow the user to edit and/or modify a labeled feature accessible to the user. For example, label editor 133 is configured to enable a user to edit a labeled feature in the hierarchical tree of labeled features 150*a*. Purely for illustration purposes, the user may wish to edit labeled features to change the can of soda to a glass bottle of soda. In one embodiment, the user is able to directly modify labeled features effecting that change via the label editor 133. In another embodiment, the label editor 133 automatically determines the related labeled features, and automatically makes modifications to those labeled features to effect the change. As such, label editor 133 outputs an edited version 150*b* of the hierarchical tree of labeled features related to the image 101. For example, FIG. 1B shows that the user has edited the labeled feature 1 from its original state provided in the hierarchical tree of labeled features 150*a*, as is shown by the edited labeled feature 1 (151*a*). For illustration purposes only, the labeled feature of the object 106*a* may be edited or modified from being labeled a "can" to a "glass bottle." No other edits to labeled features are shown to be made by the user.

In still another embodiment, a context analyzer 140 is configured to determine a context within which the user is editing one or more labeled features for the image 101. For example, when edits to one or more labeled features correspond to a different and new context than that corresponding to the original image 101, then that new context is considered by the feature modifier 140*a* of context analyzer 140 to make further modifications to one or more labeled features of the image. In that manner, the labeled features for the image are aligned with or made consistent with the new context. For example, when an image is showing a person ice skating, and the user edits a labeled feature to change the ice skates to roller skates, then the context has changed for the entire image from a cold and icy scene (e.g., outdoor or indoor ice rink, outdoor pond, etc.) to a warmer scene (e.g., skating on a road or sidewalk without snow or references to cold). In another example of context, when effecting a change in the object based on the edited labeled feature, a context corresponding to a physical property (e.g., a law of physics corresponding to the object) may be identified, generated, and/or changed. In the example provided above to change the can 106*a* to a glass bottle 106*b*, a physical property may be weight. That is, the glass bottle 106*b* may be heavier than the aluminum can 106*a*. The change in weight will affect how the object is being held by the person 105*b*. For instance, if the can is heavier, then the arm of the person 105*b* holding the glass bottle may drop when compared to when holding the can. In addition, the stance of the person 105*b* may change to balance the heavier can. As such, one or more existing labeled features may have to be modified within the image, such as changing an ice sheet to a hard surface, such as a hardwood surface or concrete. A modified version 150*c* of the hierarchical tree of labeled features is then output by the context analyzer 140. For example, FIG. 1B shows the modified version 150*c* includes modified labeled feature 1 (151*b*), and modified labeled feature 2 (152*a*) as well as modified labeled sub-feature 3 (152*b*) (i.e., a sub-feature of feature 2), and a deleted feature 4 (153). Note that the labeled feature N (154) has not been modified in the modified version 150*c* of the hierarchical tree of labeled features.

In addition, the user may wish to add features to the original image 101. For example, if the image 101 includes a stream with large boulders, the user may wish to add new boulders, or wish to add an entirely new object, such as a crashed car that fell into the stream. The feature adder 140*b* would add labeled features corresponding to the newly added object to the edited version 150*b* of the hierarchical tree of labeled features related to the image 101. For example, in FIG. 1B, the modified version 150*c* includes the newly added labeled feature N+1 (154), and newly added labeled sub-feature N+2 (155). A newly edited or modified version (not shown) may again be analyzed for context by the context analyzer 140 to make additional changes to labeled features for context, etc. In that manner, the modified version 150*c* of the hierarchical tree of labeled features is then output by the context analyzer 140.

The modified version 150*c* of the hierarchical tree of labeled features may be encoded into a latent space vector by encoder 160. In particular, the encoder 160 outputs a prompt as a conditioning factor that is associated with the encoded and modified version 150*d* of the hierarchical tree of labeled features. In one embodiment, the modified version 150*c* may be in a format that is suitable for performing latent diffusion, such as when the diffusion model 180 internally generates a hierarchical tree of labeled features as a conditioning factor for each internal iteration it performs, such as a latent representation of the modified image 102 at each iteration.

More particularly, to modify the original image 101 based on the edited labeled features, the IGAI processing or diffusion model 180 may act in latent space to perform latent diffusion, based on edited labeled features of the image 101. In that manner, an iterative process may be implemented to tune the original image 101 through one or more rounds of providing user feedback (e.g., edited labeled features) to force or guide the IGAI processing model 180 to a specific, desired outcome, such as a modified image. A more detailed description of the operations performed by the IGAI processing model 202 to generate an image based on user input is provided in FIGS. 2A-2C.

In general, latent diffusion includes the process of adding and removing noise to generate the image (i.e., modified image 102). For example, the modified image can be generated from a noise patch 176 (i.e., generated by noise adder 175, including randomly generated noise, or predicted noise of the original image) concatenated with a vector (e.g., the latent vector space generated from the encoded and modified version 150*d* of the hierarchical tree of labeled features) for conditioning (i.e., by the diffusion model 180), wherein the vector defines the parameters by which the modified image 102 is constructed using latent diffusion by the diffusion model 180. That is, the noise patch 176 is concatenated with a prompt (e.g., text prompt or latent vector space generated from the encoded and modified version 150*d* of the hierarchical tree of labeled features) by the conditioner 170 into a set of conditioning factors that is provided as input into the diffusion model 180. Latent diffusion is performed to process and/or generate (e.g., encode or denoise) a modified or updated image 102 based on the first set of conditioning factors. The modified or updated portion of the original image is encoded, such as into a latent space representation. Multiple steps of noising and denoising may be performed iteratively by the diffusion model 180 when processing the original image 101, wherein at each step the diffusion model 180 outputs an iterative latent space representation of the image undergoing modification. In some embodiments, the latent space representation may be the hierarchical tree of labeled features, or an encoded version thereof.

As such, the diffusion model 180 generates a latent space representation of the image 101, now modified, and after decoding, the decoder 190 outputs the modified image 102. This process may be repeated iteratively by the user to achieve a desired and final or resulting image. For example, the modified image 102 that is generated may include a glass bottle 106*b* to be held by the person 105*b* (newly generated version of the person). The person 105*b* may be in a second orientation for holding the glass bottle 106*b*, wherein the arm of the person not holding the glass bottle is oriented upwards (i.e., previously the arm was oriented upwards in the original image 101). Because of the operations implemented by the IGAI processing model 180, the orientation of the person may change. For example, a noise profile implemented by the IGAI processing or diffusion model 180 may induce the change in the orientation of the person 105 (e.g., arm position). After modifications to the image 101 have been made by the IGAI processing or diffusion model 180, the modified image 102 may then be shown via display 131.

In one embodiment, the generation of an output image, graphics, and/or three-dimensional representation by an image generation AI (IGAI), can include one or more artificial intelligence processing engines and/or models. In general, an AI model is generated using training data from a data set. The data set selected for training can be custom curated for specific desired outputs and in some cases the training data set can include wide ranging generic data that can be consumed from a multitude of sources over the Internet. By way of example, an IGAI should have access to a vast of amount of data, e.g., images, videos and three-dimensional data. The generic data is used by the IGAI to gain understanding of the type of content desired by an input. For instance, if the input is requesting the generation of a tiger in the Sahara desert, the data set should have various images of tigers and deserts to access and draw upon during the processing of an output image. The curated data set, on the other hand, maybe be more specific to a type of content, e.g., video game related art, videos and other asset related content. Even more specifically, the curated data set could include images related to specific scenes of a game or actions sequences including game assets, e.g., unique avatar characters and the like. As described above, an IGAI can be customized to enable entry of unique descriptive language statements to set a style for the requested output images or content. The descriptive language statements can be text or other sensory input, e.g., inertial sensor data, input speed, emphasis statements, and other data that can be formed into an input request. The IGAI can also be provided images, videos, or sets of images to define the context of an input request. In one embodiment, the input can be text describing a desired output along with an image or images to convey the desired contextual scene being requested as the output.

In one embodiment, an IGAI is provided to enable text-to-image generation. Image generation is configured to implement latent diffusion processing, in a latent space, to synthesize the text to image processing. In one embodiment, a conditioning process assists in shaping the output toward the desired using output, e.g., using structured metadata. The structured metadata may include information gained from the user input to guide a machine learning model to denoise progressively in stages using cross-attention until the processed denoising is decoded back to a pixel space. In the decoding stage, upscaling is applied to achieve an image, video, or 3D asset that is of higher quality. The IGAI is therefore a custom tool that is engineered to processing specific types of input and render specific types of outputs.

When the IGAI is customized, the machine learning and deep learning algorithms are tuned to achieve specific custom outputs, e.g., such as unique image assets to be used in gaming technology, specific game titles, and/or movies.

In another configuration, the IGAI can be a third-party processor, e.g., such as one provided by Stable Diffusion or others, such as OpenAI's GLIDE, DALL-E, MidJourney or Imagen. In some configurations, the IGAI can be used online via one or more Application Programming Interface (API) calls. It should be understood that reference to available IGAI is only for informational reference. For additional information related to IGAI technology, reference may be made to a paper published by Ludwig Maximilian University of Munich titled "*High-Resolution Image Synthesis with Latent Diffusion Models*", by Robin Rombach, et al., pp. 1-45. This paper is incorporated by reference.

Figure 2A:
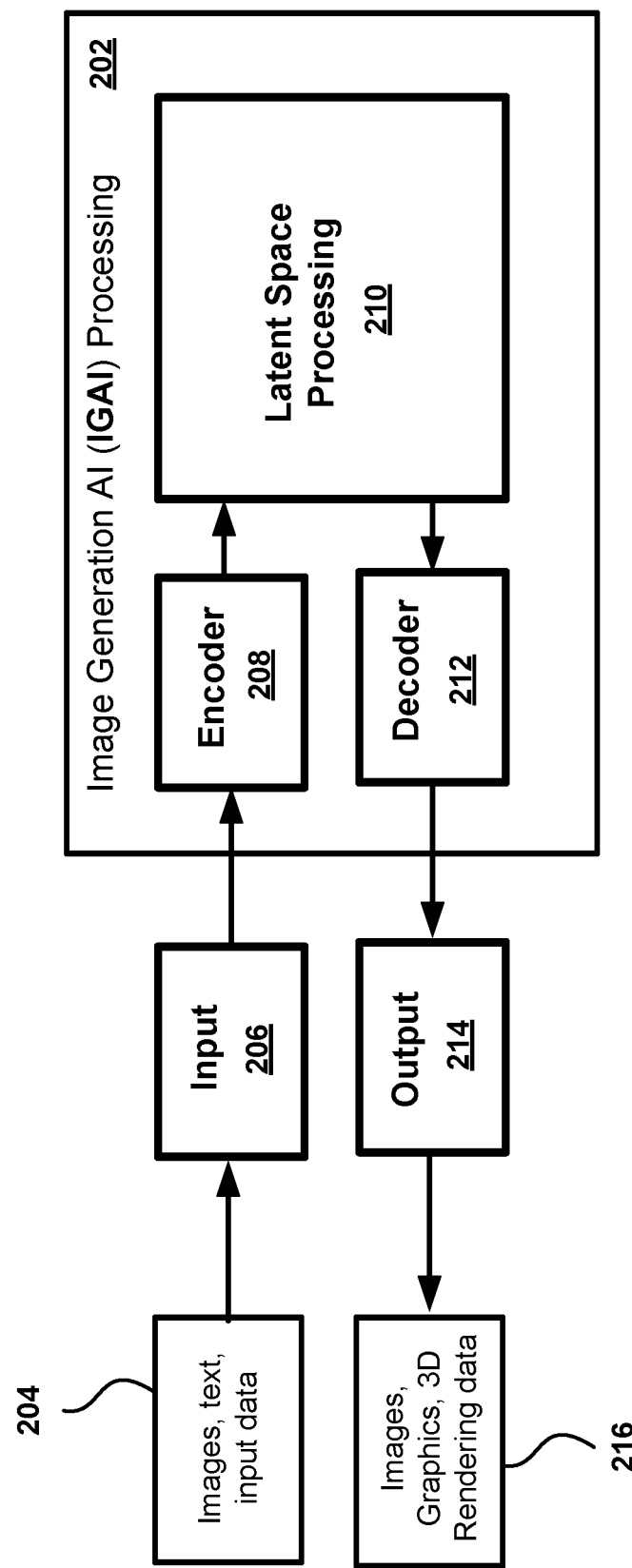
FIG. 2A is a general representation of an image generation artificial intelligence (IGAI) processing sequence, in accordance with one embodiment.

FIG. 2A is a general representation of an image generation AI (IGAI) 202 processing sequence (also referred to as the IGAI processing model 202), in accordance with one embodiment. As shown, input 206 is configured to receive input in the form of data, e.g., text description having semantic description or key words. The text description can in the form of a sentence, e.g., having at least a noun and a verb. The text description can also be in the form of a fragment or simply one word. The text can also be in the form of multiple sentences, which describe a scene or some action or some characteristic. In some configuration, the input text can also be input in a specific order so as to influence the focus on one word over others or even deemphasize words, letters or statements. Still further, the text input can be in any form, including characters, emojis, ions, foreign language characters (e.g., Japanese, Chinese, Korean, etc.). In one embodiment, text description is enabled by contrastive learning. The basic idea is to embed both an image and text in a latent space so that text corresponding to an images maps to the same area in the latent space as the image. This abstracts out the structure of what it means to be a dog for instance from both the visual and textual representation. In one embodiment, a goal of contrastive representation learning is to learn an embedding space in which similar sample pairs stay close to each other while dissimilar ones are far apart. Contrastive learning can be applied to both supervised and unsupervised settings. When working with unsupervised data, contrastive learning is one of the most powerful approaches in self-supervised learning.

In addition to text, the input can also include other content, e.g., such as images or even images that have descriptive content themselves. Images can be interpreted using image analysis to identify objects, colors, intent, characteristics, shades, textures, three-dimensional representations, depth data, and combinations thereof. Broadly speaking, the input 206 is configured to convey the intent of the user that wishes to utilize the IGAI to generate some digital content. In the context of game technology, the target content to be generated can be a game asset for use in a specific game scene. In such a scenario, the data set used to train the IGAI and input 206 can be used to customized the way artificial intelligence, e.g., deep neural networks process the data to steer and tune the desired output image, data or three-dimensional digital asset.

The input 206 is then passed to the IGAI, where an encoder 208 takes input data and/or pixel space data and converts into latent space data. The concept of "latent space" is at the core of deep learning, since feature data is reduced to simplified data representations for the purpose of finding patterns and using the patterns. The latent space processing 210 is therefore executed on compressed data, which significantly reduces the processing overhead as compared to processing learning algorithms in the pixel space, which is much more heavy and would require significantly more processing power and time to analyze and produce a desired image. The latent space is simply a representation of compressed data in which similar data points are closer together in space. In the latent space, the processing is configured to learn relationships between learned data points that a machine learning system has been able to derive from the information that it gets fed, e.g., the data set used to train the IGAI. In latent space processing 210, a diffusion process is computed using diffusion models. Latent diffusion models rely on autoencoders to learn lower-dimension representations of a pixel space. The latent representation is passed through the diffusion process to add noise at each step, e.g., multiple stages. Then, the output is fed into a denoising network based on a U-Net architecture that has cross-attention layers. A conditioning process is also applied to guide a machine learning model to remove noise and arrive at an image that represents closely to what was requested via user input. A decoder 212 then transforms a resulting output from the latent space back to the pixel space. The output 214 may then be processed to improve the resolution. The output 214 is then passed out as the result, which may be an image, graphics, 3D data, or data that can be rendered to a physical form or digital form.

Figure 2B:
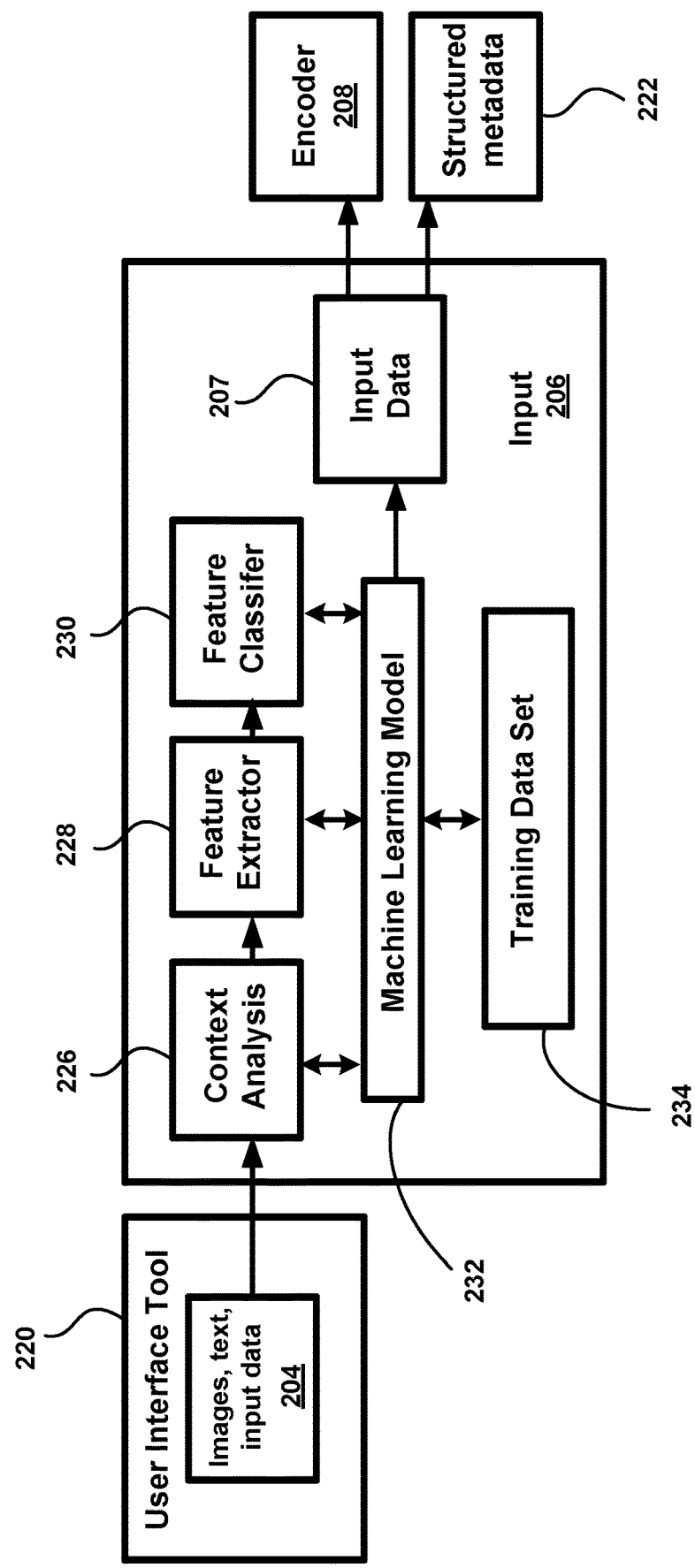
FIG. 2B illustrates additional processing that may be done to the input provided to the IGAI processing sequence described in FIG. 2A, in accordance with one embodiment of the present disclosure.

FIG. 2B illustrates, in one embodiment, additional processing that may be done to the input 206. A user interface tool 220 may be used to enable a user to provide an input request 204. The input request 204, as discussed above, may be images, text, structured text, or generally data. In one embodiment, before the input request is provided to the encoder 208, the input can be processed by a machine learning process that generates a machine learning model 232, and learns from a training data set 234. By way of example, the input data maybe be processed to via a context analyzer 226 to understand the context of the request. For example, if the input is "space rockets for flying to the mars", the input can be analyzed 226 to determine that the context is related to outer space and planets. The context analysis may use machine learning model 232 and training data set 234 to find related images for this context or identify specific libraries of art, images or video. If the input request also includes an image of a rocket, the feature extractor 228 can function to automatically identify feature characteristics in the rocket image, e.g., fuel tank, length, color, position, edges, lettering, flames, etc. A feature classifier 230 can also be used to classify the features and improve the machine learning model 232. In one embodiment, the input data 207 can be generated to produce structured information that can be encoded by encoder 208 into the latent space. Additionally, it is possible to extract out structured metadata 222 from the input request. The structured metadata 222 may be, for example, descriptive text used to instruct the IGAI 202 to make a modification to a characteristic or change to the input images or changes to colors, textures, or combinations thereof. For example, the input request 204 could include an image of the rocket, and the text can say "make the rocket wider" or "add more flames" or "make it stronger" or some of other modifier intended by the user (e.g., semantically provided and context analyzed). The structured metadata 222 can then be used in subsequent latent space processing to tune the output to move toward the user's intent. In one embodiment, the structured metadata may be in the form of semantic maps, text, images, or data that is engineered to represent the user's intent as to what changes or modifications should be made an input image or content.

Figure 2C:
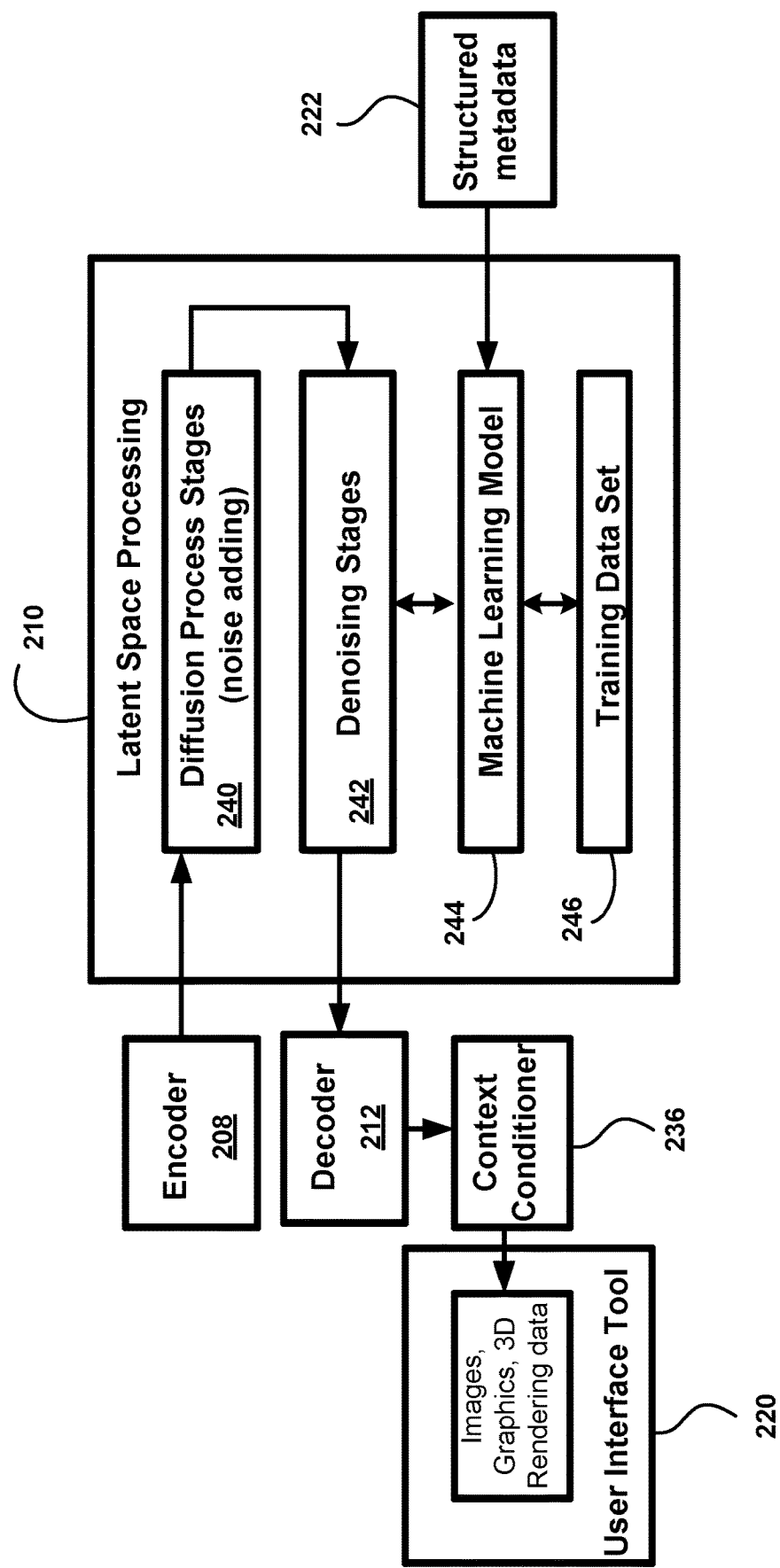
FIG. 2C illustrates how the output of the encoder used is then fed into latent space processing in the IGAI processing sequence, in accordance with one embodiment.

FIG. 2C illustrates how the output of the encoder 208 is then fed into latent space processing 210, in accordance with one embodiment. A diffusion process is executed by diffusion process stages 240, wherein the input is processed through a number of stages to add noise to the input image or images associated with the input text. This is a progressive process, where at each stage, e.g., 10-50 or more stages, noise is added. Next, a denoising process is executed through denoising stages 242. Similar to the noise stages, a reverse process is executed where noise is removed progressively at each stage, and at each stage, machine learning is used to predict what the output image or content should be, in light of the input request intent. In one embodiment, the structured metadata 222 can be used by a machine learning model 244 at each stage of denoising, to predict how the resulting denoised image should look and how it should be modified. During these predictions, the machine learning model 244 uses the training data set 246 and the structured metadata 222, to move closer and closer to an output that most resembles the requested in the input. In one embodiment, during the denoising, a U-Net architecture that has cross-attention layers may be used, to improve the predictions. After the final denoising stage, the output is provided to a decoder 212 that transforms that output to the pixel space. In one embodiment, the output is also upscaled to improve the resolution. The output of the decoder, in one embodiment, can be optionally run through a context conditioner 236. The context conditioner is a process that may use machine learning to examine the resulting output to make adjustments to make the output more realistic or remove unreal or unnatural outputs. For example, if the input asks for "a boy pushing a lawnmower" and the output shows a boy with three legs, then the context conditioner can make adjustments with in-painting processes or overlays to correct or block the inconsistent or undesired outputs. However, as the machine learning model 244 gets smarter with more training over time, there will be less need for a context conditioner 236 before the output is rendered in the user interface tool 220.

Figure 3:
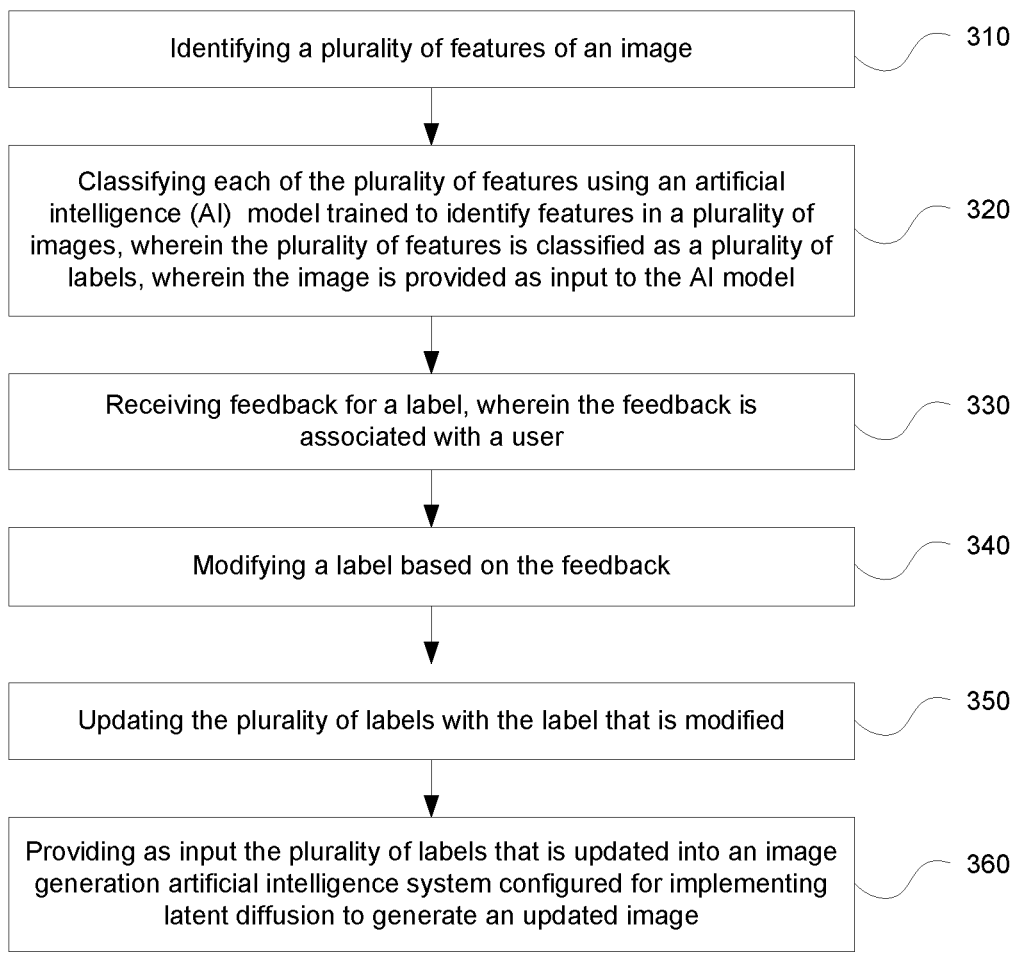
FIG. 3 is a flow diagram illustrating a method for modifying an image generated using an image generation artificial intelligence model implementing latent diffusion techniques based on editing of labeled features of the image, in accordance with one embodiment of the present disclosure.

With the detailed description of the system 100 of FIG. 1 and the image generation AI (IGAI) 202 processing sequence of FIGS. 2A-2C, flow diagram 300 of FIG. 3 discloses a method for modifying an image generated using an image generation artificial intelligence model implementing latent diffusion techniques based on editing of labeled features of the image, in accordance with one embodiment of the present disclosure. The operations performed in the flow diagram may be implemented by one or more of the previously described components, and also system 100 described in FIG. 1, including, in part, user interface 130 and/or IGAI processing model 202. In particular, flow diagram 300 may be implemented to enable modification to an image, wherein an IGAI model implementing latent diffusion generates the modified image based on one or more edits to one or more labeled features of the original image provided by a user. Multiple iterations of modifications to images generated at each iterative step may provide for tuning of the image by forging or guiding the IGAI processing model to a specific, desired outcome (i.e., final resulting image that has been iteratively modified).

At 310, the method includes identifying a plurality of features of an image, such as an original image. For example, the image 101 may be a previously generated digital image, or an analog image that has been digitized. In some embodiments, the original image may have been generated using an IGAI model implementing latent diffusion in response to user input (e.g., description of a desired image that is encoded into a latent space vector). For example, the image is generated by the IGAI processing model of FIGS. 1 and FIGS. 2A-2C. The extracted features are relevant to generating images using latent diffusion, and in one embodiment, an AI model is configured for extracting those features.

At 320, the method including classifying each of the plurality of features that is extracted using an AI model that is configured to identify and/or classify features found across a plurality of images. For the original image, the plurality of features of the image and previously identified is classified as a plurality of labels. That is, the AI model is configured to label the extracted features of the image. In one embodiment, the image is provided as input to the AI model that may be configured to identify and/or classify features within the image. In one embodiment, the AI model is configured to output a hierarchical tree of labeled features for the original image.

At 330, the method including receiving feedback from a user for a label in the hierarchical tree of labeled features for the original image. For example, the feedback may be provided via a user interface configured to enable editing of an identified labeled feature. The feedback may be formatted in text or audio, or in any format (e.g., likes and dislikes, etc.) suitable for enabling editing of an identified and labeled feature of the image.

At 340, the method including modifying a label (e.g., a feature that has been classified with a label—i.e., a labeled feature) based on the feedback. In one embodiment, the labeled feature is identified from a hierarchical tree of labeled features of the image that is presented to the user on a display (e.g., via an interface). Furthermore, editing of the labeled feature may be provided directly through the user interface presenting the hierarchical tree of labeled features, such as by changing the text of the labeled feature. In another embodiment, the user highlights an object or characteristic of the image that is displayed, wherein corresponding labeled features are displayed to the user, and editing of one of the labeled features can be made by the user. In another embodiment, the editing and/or modifying of the labeled feature may be provided by commentary by the user once the labeled feature has been identified. For instance, the user may present commentary as feedback in natural language (e.g., change the can held by the person in the image to a glass bottle), which is then translated (e.g., into text) and analyzed to identify the relevant labeled features and provide modifications to those labeled features in the hierarchical tree of labeled nodes in response to the commentary. In one embodiment, the commentary in text format and/or the resulting modifications to the relevant labeled features are displayed to the user for verification.

At 350, the method including updating the plurality of labels with the label that is modified. In particular, features of the image have been extracted and classified into a plurality of labels, such as in a hierarchical tree of labeled features. Further, one or more labeled features have been edited by a user, such as by directly editing a labeled feature in the hierarchical tree that may be displayed, or by highlighting an object or characteristic in the image and displaying labeled features of the object and also enabling editing of a labeled feature of the object, or by providing feedback to the image as commentary that is automatically analyzed for purposes of automatically modifying a related labeled feature.

At 360, the method including providing as input the plurality of labels, that is updated with the edited and/or modified labeled, into an IGAI processing model or system configured for implementing latent diffusion to generate an updated or modified image. As previously described, the IGAI processing model adds and removes noise from a noisy image or patch, wherein the noise patch is concatenated with a vector for conditioning (e.g., the plurality of labels of the image, that is updated with the edited and/or modified labeled, that may be encoded into a latent vector in latent vector space). During latent diffusion, each step of denoising or encoding yields a new latent representation of the image (at low resolution), with some amount of noise removed. The latent representation of the image is then decoded to generate a high resolution modified image as output.

In one embodiment, as previously introduced a user interface facilitates interaction with the user providing feedback. For example, the user interface may be configured to display the image and the modified image to the user. In that manner, the user is able to visualize the image in order to understand what modifications can be made, as reflected in the feedback. Also, the user interface may be configured for highlighting a portion of the image (e.g., an area, an object, a characteristic, etc.), wherein the highlighting indicates a selection of the portion of the image. Further, the user interface may be configured to receive the commentary of the user to reflect feedback and/or editing of the image (e.g., editing of a labeled feature). For example, the commentary may be provided by text input, natural language, or a voice of the user, wherein the user interface may include an audio receiver or an interface to an audio receiver. In another example, the user interface may include an interface for communicating likes and/or dislikes with respect to the selected portion of the image.

Figure 4A:
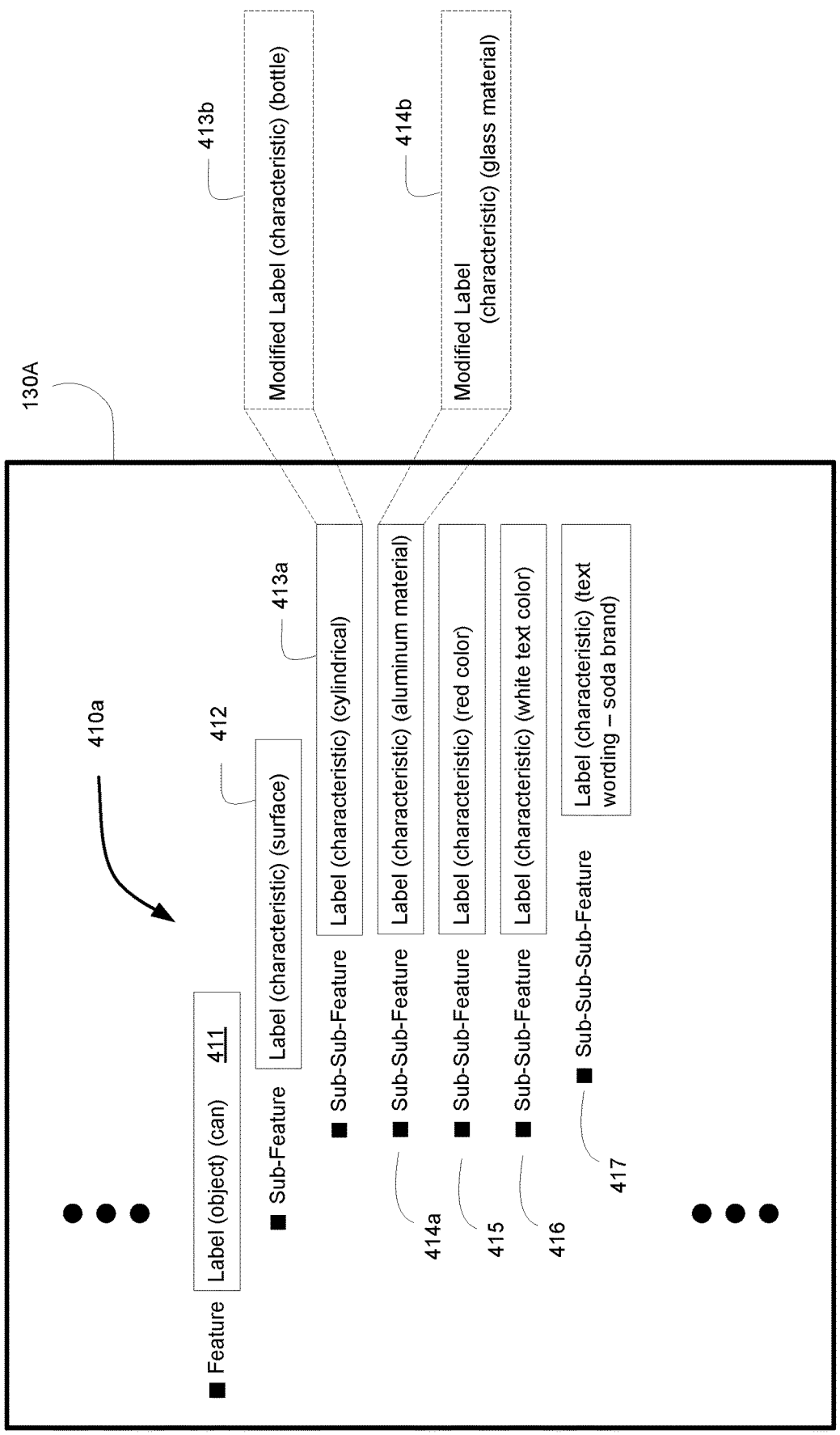
FIG. 4A illustrates a user interface enabling the editing of labeled features of an image that are displayed in a hierarchical tree of labeled features for purposes of generating a modified image using an IGAI model, in accordance with one embodiment of the present disclosure.

FIG. 4A illustrates a user interface 130A enabling the editing of labeled features of an image for purposes of generating a modified image using an IGAI model implementing latent diffusion, in accordance with one embodiment of the present disclosure. In particular, a hierarchical tree of labeled features 410a is generated for an image. For purposes of illustration, the hierarchical tree of labeled features 410a may be generated from the original image 101 of FIG. 1A that includes a person holding an object, such as a soda can, wherein the labeled features are exemplary. The hierarchical tree of labeled features 410a for the image may be presented in the user interface for purposes of editing of one or more labeled features by a user via the user interface 130A. For example, a plurality of labels of a plurality of objects and/or characteristics of a scene of the image is presented in the user interface 130A on a display accessible by the user. The plurality of objects may be presented in the user interface 130A as a hierarchical file system of objects, as is represented by the hierarchical tree of labeled features 410a.

One or more of the labeled features for the soda can object 106a are shown in the hierarchical tree of labeled features 410a. In the hierarchy, a labeled feature 411 for the can object includes one or more sub-features, wherein sub-features can also have sub-features, etc. In particular, a labeled sub-feature 412 of the object can is a surface characteristic. Various sub-sub-features of the surface are also presented, and includes labeled sub-sub-feature 413a describing a cylindrical characteristic for the surface, and a labeled sub-sub-feature 414a describing an aluminum material characteristic for the surface, and a labeled sub-sub-feature 415 describing a red color characteristic for the surface, and a labeled sub-sub-feature 416 describing a white color for characteristic for text on the surface, and a labeled sub-sub-feature 417 describing the text wording characteristic for the text (e.g., the soda brand).

In one embodiment, a method includes receiving selection of an object (e.g., via a labeled feature) by the user via the hierarchical file system, wherein the hierarchical file system may be a condensed version showing high level objects. Additional features for the object may be shown once the object feature is selected, wherein one or more labels of the object may be further presented in the user interface via the display, wherein the one or more labels of the object includes the one or more labels that are to be edited. The method including receiving identification of one or more labels to be edited by the user via the user interface. For example, labeled sub-sub-feature 413a may be selected for editing directly through the labeled features presented in the user interface 130A, wherein the editing may include changing the cylindrical characteristic of the surface to a bottle or bottle shaped characteristic of the surface, as is shown in modified label 413b. Also, labeled sub-sub-feature 414a may be selected for editing, wherein the editing may include changing the aluminum material characteristic of the surface to a glass material for the surface, as is shown in modified label 414b. As such, the modified image can be generated based on the editing of one or more labeled features, as previously described.

Figure 4B:
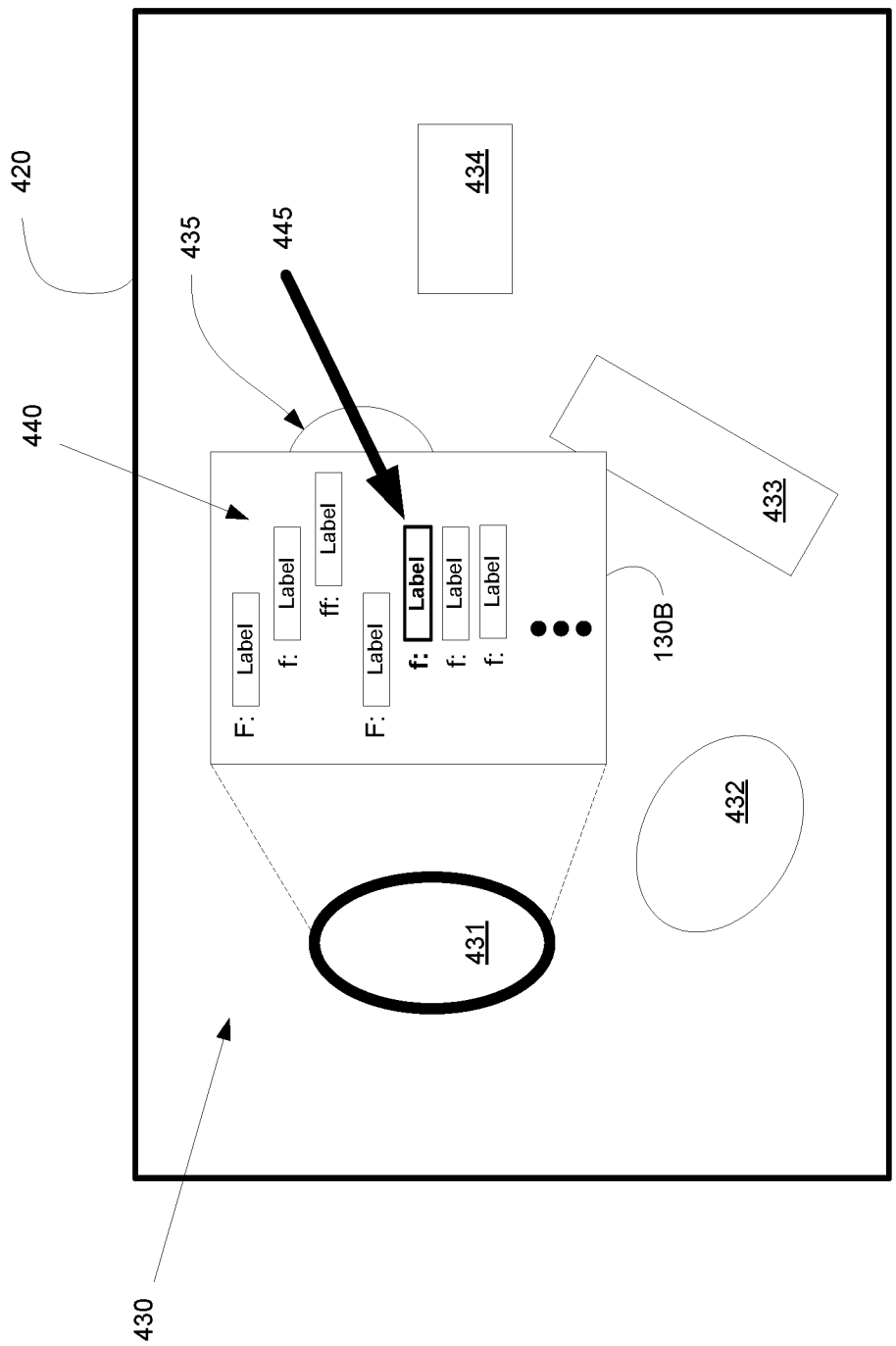
FIG. 4B illustrates the selection of an object within a scene that is displayed, and the presentation of labeled features of the object in association with the object to enable editing of one or more labeled features for purposes of generating a modified image using an IGAI model, in accordance with one embodiment of the present disclosure.

FIG. 4B illustrates the selection of an object 431 within a scene 430 that is presented on a display 420, and the presentation of labeled features of the object in association with the object to enable editing of one or more labeled features for purposes of generating a modified image using an IGAI model, in accordance with one embodiment of the present disclosure. FIG. 4B illustrates how a user is able to access labeled features of objects in a scene that is viewed by selecting an object, having labeled features for that object shown in a user interface 130B, and the editing of a selected labeled feature via the user interface. In that manner, a modified image can be generated based on the editing of the labeled feature, as previously described.

As shown, the scene 430 includes one or more objects represented generally by one or more shapes in various orientations. For example, scene 430 includes an oval object 431, another oval object 432, a rectangular object 433, another rectangular object 434, and an oval object 435.

In one embodiment, a method includes receiving identification of the object within a scene 430 that is presented on a display. For example, the user is able to select object 431 using any suitable technique via interaction with the object presented in the display 420. For example, the user may select object 431 using a controller. In another example, the user can select the object 431 by pointing to the object as presented on the display, such as by tracking movement of the hand and determining direction of pointing of the hand. In another example, the user can select object 431 by determining that the user is pointing to a location in physical space corresponding to a location of the object within the scene in virtual space, wherein the scene is presented on the display of a head mounted display worn by the user. As such, the object can be identified based on the direction of the pointing and correlating that direction to points in the scene.

In addition, the method includes presenting one or more labels of the object 431 in a user interface via the display, wherein the one or more labels of the object includes the label to be edited (e.g., labeled feature 445). For example, once it is determined that object 431 has been selected, the portion 440 of the hierarchical tree of labeled features corresponding to the object 431 is presented in the user interface 130B, which is presented on display 420. As shown, the user interface 130B is shown overlaid part of object 435. The portion 440 of the hierarchical tree includes one or more of labeled features, sub-features, sub-sub-features, etc.

The method including receiving identification of the label by a user via the user interface. As shown, the labeled feature 445 is selected by the user for editing. In that manner, the user is able to view a scene, select an object for providing feedback, and change one or more labeled features for that object that are automatically presented to the user upon selection of the object using techniques previously described. As such, the modified image can be generated based on the editing of the labeled feature, as previously described.

Figure 4C:
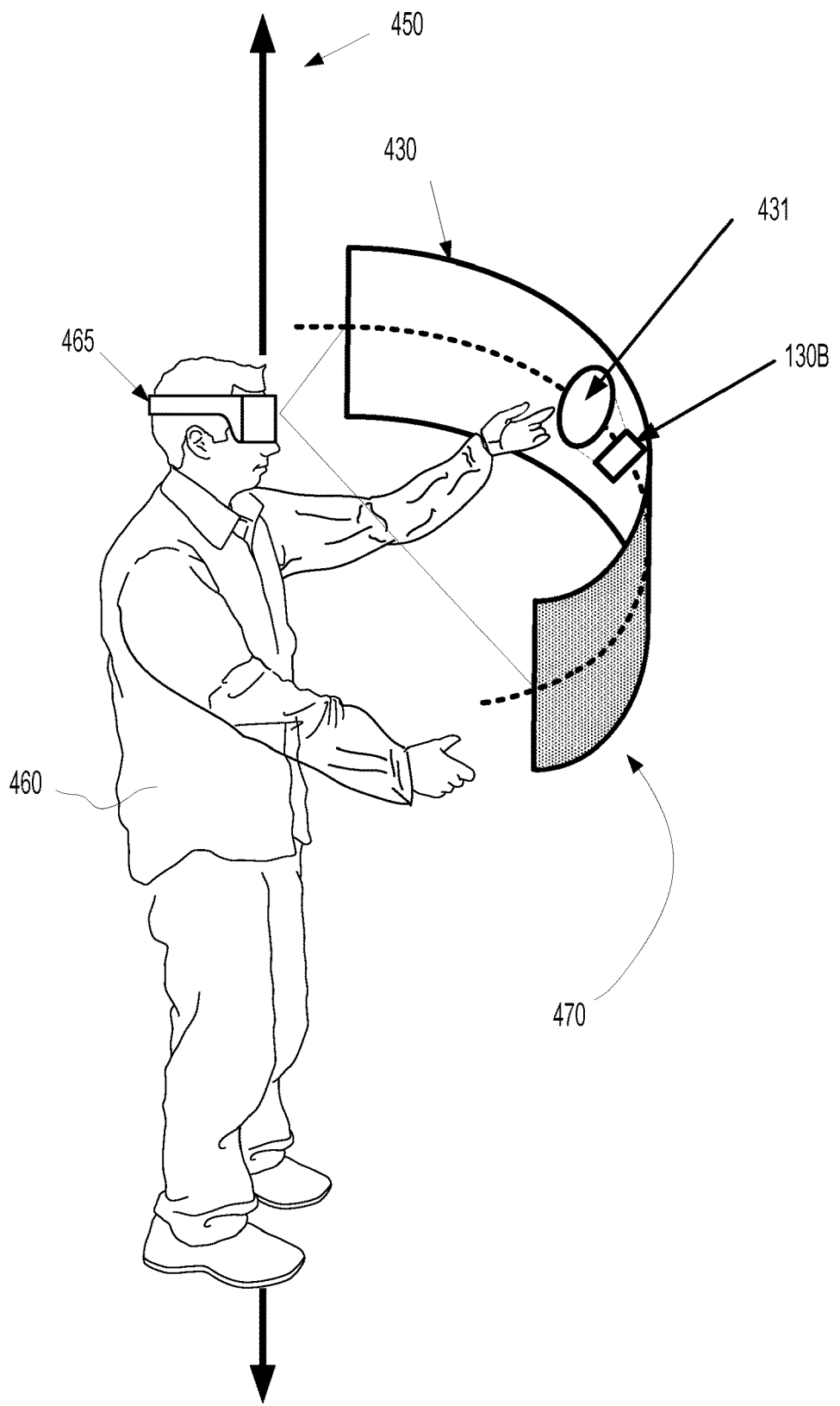
FIG. 4C illustrates a virtual reality editor providing for the selection of an object within a scene in three dimensional space, and the editing of one or more labeled featured of the object for purposes of generating a modified image using an IGAI model, in accordance with one embodiment of the present disclosure.

FIG. 4C illustrates a virtual reality editor providing for the selection of an object within a scene in three dimensional (3D) space that is virtual, and the editing of one or more labeled featured of the object for purposes of generating a modified image using an IGAI model, in accordance with one embodiment of the present disclosure. As shown, user 460 is wearing a head mounted display (HMD) 465 for viewing the 3D virtual space 470. For purposes of illustration only, the user 460 is viewing the same scene 430 that is displayed in two dimensional space (e.g., on display 420) in FIG. 4B. In FIG. 4B, user 460 is viewing scene 430 in 3D virtual space 470 via the HMD. As previously described, scene 430 includes one or more objects, including object 431 that is to be modified.

In one embodiment, a method includes determining that the user is pointing to a location in physical space corresponding to a location of an object within the scene in virtual space 470, wherein the scene 430 is presented on a display of a head mounted display 465 worn by the user 460. Based on the pointing, the object is highlighted. For example, object 431 is determined to be the object that the user is pointing towards, and as a result that object is highlighted within the scene 430. Previously described techniques can be applied for editing a label of object 431. For example, the method described in FIG. 4B for selecting object 431, presenting labeled features for the object in a user interface that is displayed, and the direct editing of a selected labeled feature via the user interface as described within a two dimensional display are equally applicable to the three dimensional presentation of the scene 430 in virtual space of the HMD 465. That is, the user 460 is able to select object 431 using the HMD via pointing or use of a controller or any other technique, and edit a labeled feature presented in the user interface in 3D virtual space.

In other embodiments, the user is able to direct the editing of a labeled feature through commentary by the user. For example, a method includes receiving commentary or feedback to modify the object from the user, wherein the commentary is presented in natural language. The object may be identified through pointing as previously described, or purely through the commentary, wherein analysis is performed to identify the object that is selected by the user.

The method including determining one or more labels of the object, wherein the one or more labels of the object includes the label to be edited. The labeled features may be presented to the user via the user interface in the 3D virtual space. In addition, selection of a labeled feature for editing may be manually performed by the user, as previously described, via pointing, or hand gestures, or controller input. In other embodiment, the selection of a labeled feature for editing may be controlled via user commentary providing one or more instructions. In another embodiment, the labeled feature selected for editing may be determined through analysis, such that the commentary does not specifically select a labeled feature for editing, but is determined to apply to or corresponding to the selected labeled feature. The commentary is further analyzed to determine the proper feedback or editing to be applied to the selected labeled feature, and then performing the editing of the labeled feature corresponding to the commentary. As such, the modified image can be generated based on the editing of the labeled feature, as previously described.

In one embodiment, the process for editing is automatically controlled. The user need only provide feedback of an image through commentary. For example, a method includes receiving commentary to modify an object in a scene of the image from the user, wherein the commentary is presented in natural language. The method includes determining the object within the scene towards which the commentary applies or is directed. In one implementation, the object may be highlighted within the scene to indicate to the user which object is undergoing modification. The method automatically determines one or more labeled features for the selected object, and automatically determines that the commentary and/or feedback applies to a corresponding labeled feature. The commentary is translated to determine the proper feedback and/or editing to apply to the selected labeled feature. As such, the modified image can be generated based on the editing of the labeled feature, as previously described.

In one embodiment, based on the editing of one or more labeled features by a user, a context of the image and the changes made to the image by user is determined. Further modifications to the labeled features for the image may be made in alignment with or in consideration of the context that is determined. The updated plurality of labels or labeled features, including labeled features that have been modified, is then provided to the IGAI model to generate a modified image, based in part on the editing of the labeled feature, as previously described.

In one embodiment, in addition to or in place of the editing of one or more labeled features by a user, a new object may be added based on commentary. One or more new labeled features corresponding to the new object may be added to the plurality of labeled features for the corresponding scene or image. Context of the change may be determined. Further modifications to the labeled features for the image may be made in alignment with or in consideration of the context that is determined. The updated plurality of labels or labeled features, including labeled features that have been modified, is then provided to the IGAI model to generate a modified image, based in part on the editing of the labeled feature, as previously described.

In one embodiment, based on the editing of one or more labeled features by a user, an object may be removed from the scene. In that manner, labeled features for that object are removed from the hierarchical tree of labeled features for the corresponding image or scene. Context of the change may be determined. Further modifications to the labeled features for the image may be made in alignment with or in consideration of the context that is determined. The updated plurality of labels or labeled features, including labeled features that have been modified, is then provided to the IGAI model to generate a modified image, based in part on the editing of the labeled feature, as previously described.

Figure 5:
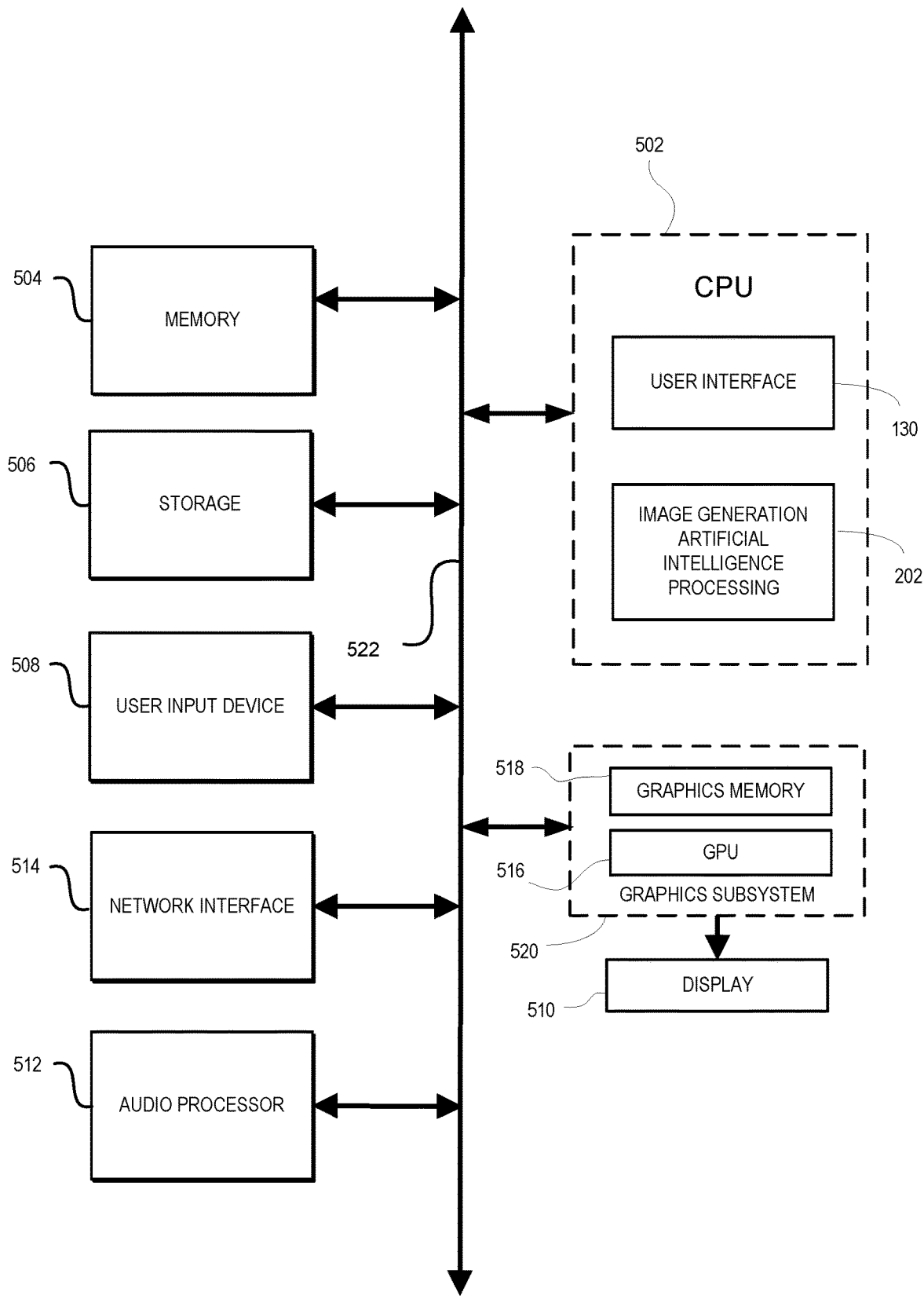
FIG. 5 illustrates components of an example device that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be a localized to a player playing a game segment (e.g., game console), or remote from the player (e.g., back-end server processor), or one of many servers using virtualization in a game cloud system for remote streaming of gameplay to clients, or for implementing additional services such as a supervisor functionality.

In particular, CPU 502 may be configured to implement a IGAI processing model 202 and/or a user interface 130 including a label editor configured to enable modification to an image based, in part, on editing of one or more labeled features of the image, wherein the labeled features of the image are automatically extracted and determined for purposes of editing of one or more labeled features and the generation of the modified image. The process may be repeated to provide for iterative tuning of the image by forcing or guiding the implementation of the latent diffusion techniques to a specific, desired outcome (i.e., the resulting image generated through iteratively generated modified images). In one embodiment, the CPU 502 may be configured to implement a user interface 130 that is configured to facilitate the enablement of modification of the image. For example, the user interface 110 may be configured to display the original and/or modified image, to highlight a selected object, to display a hierarchical tree of labeled features of the image or a portion thereof, to receive commentary of the user as feedback (e.g., in the form of natural language, or communication of likes and/or dislikes), provide for the editing of labeled features, etc.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 516, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In an embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs. In one embodiment, GPU 516 may be implemented within an AI engine (e.g., machine learning engine 190) to provide additional processing power, such as for the AI, machine learning functionality, or deep learning functionality, etc.

The graphics subsystem 520 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

In other embodiments, the graphics subsystem 520 includes multiple GPU devices, which are combined to perform graphics processing for a single application that is executing on a corresponding CPU. For example, the multiple GPUs can perform alternate forms of frame rendering, wherein GPU 1 renders a first frame, and GPU 2 renders a second frame, in sequential frame periods, and so on until reaching the last GPU whereupon the initial GPU renders the next video frame (e.g., if there are only two GPUs, then GPU 1 renders the third frame). That is the GPUs rotate when rendering frames. The rendering operations can overlap, wherein GPU 2 may begin rendering the second frame before GPU 1 finishes rendering the first frame. In another implementation, the multiple GPU devices can be assigned different shader operations in the rendering and/or graphics pipeline. A master GPU is performing main rendering and compositing. For example, in a group including three GPUs, master GPU 1 could perform the main rendering (e.g., a first shader operation) and compositing of outputs from slave GPU 2 and slave GPU 3, wherein slave GPU 2 could perform a second shader (e.g., fluid effects, such as a river) operation, the slave GPU 3 could perform a third shader (e.g., particle smoke) operation, wherein master GPU 1 composites the results from each of GPU 1, GPU 2, and GPU 3. In that manner, different GPUs can be assigned to perform different shader operations (e.g., flag waving, wind, smoke generation, fire, etc.) to render a video frame. In still another embodiment, each of the three GPUs could be assigned to different objects and/or parts of a scene corresponding to a video frame. In the above embodiments and implementations, these operations could be performed in the same frame period (simultaneously in parallel), or in different frame periods (sequentially in parallel).

Accordingly, in various embodiments the present disclosure describes systems and methods configured for providing modification of an image based, in part, on editing of one or more labeled features of the image.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

Access to the cloud gaming network by the client device may be achieved through a communication network implementing one or more communication technologies. In some embodiments, the network may include $5^{th}$ Generation (5G) network technology having advanced wireless communication systems. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in the prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g., tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
   identifying a plurality of features of an image;
   classifying each of the plurality of features using an artificial intelligence (AI) model trained to classify features in a plurality of images, wherein the plurality of features is classified as a plurality of labels, and wherein the image is provided as input to the AI model;
   determining, based on a commentary, an object within the image to which the commentary applies;
   determining one or more labels of the object to which the commentary applies;
   translating the commentary into feedback for the one or more labels;
   modifying the one or more labels based on the feedback;
   updating the plurality of labels with the one or more labels that is modified; and
   providing, as input, the plurality of labels that is updated into an image generation artificial intelligence system configured for implementing latent diffusion to generate an updated image.

2. The method of claim 1, further comprising:
   generating the image using the image generation artificial intelligence system.

3. The method of claim 1, further comprising:
   receiving the feedback via a user interface,
   wherein the feedback is formatted in text.

4. The method of claim 1, further comprising:
   receiving the feedback as audio, wherein the feedback is presented in natural language;
   converting the audio to text; and
   presenting the text via a user interface.

5. The method of claim 1, further comprising:
   receiving identification of an object within a scene that is presented on a display;
   presenting one or more labels of the object in a user interface via the display, wherein the one or more labels of the object includes the label; and
   receiving identification of the label by a user via the user interface.

6. The method of claim 5, wherein the receiving identification of the object includes:
   determining that the user is pointing to a location in physical space corresponding to a location of the object within the scene in virtual space, wherein the scene is presented on the display of a head mounted display worn by the user; and
   determining that the user is pointing to the object within the scene based on the pointing.

7. The method of claim 5, wherein the receiving identification of the object includes:
   determining that the user selects the object in the scene using a controller.

8. The method of claim 1, further comprising:
   presenting a plurality of labels of a plurality of objects of a scene of the image in a user interface on a display, wherein the plurality of objects are presented in the user interface as a hierarchical file system of objects;
   receiving selection of an object via the hierarchical file system;
   presenting one or more labels of the object in the user interface via the display, wherein the one or more labels of the object includes the label; and
   receiving identification of the label by the user via the user interface.

9. The method of claim 1, further comprising:
   highlighting the object that is presented on a display.

10. The method of claim 1, further comprising:
    determining that a user is pointing to a location in physical space corresponding to a location of an object within a scene in virtual space, wherein the scene is presented on a display of a head mounted display worn by the user;
    highlighting the object in the scene;
    determining that the user is selecting the object based on the pointing;
    receiving commentary to modify the object from the user, wherein the commentary is presented in natural language;
    determining one or more labels of the object, wherein the one or more labels of the object includes the label;
    determining that the commentary applies to the label; and
    translating the commentary into the feedback for the label.

11. The method of claim 1, further comprising:
    determining a context based on the feedback for the label; and
    modifying one or more of the plurality of labels based on the context,
    wherein the plurality of labels that is updated includes one or more of the plurality of labels that have been modified.

12. The method of claim 1, further comprising:
    adding a new object corresponding to the label based on the feedback;
    determining a context based on the new object; and
    modifying one or more of the plurality of labels based on the context,
    wherein the plurality of labels that is updated includes one or more of the plurality of labels that have been modified.

13. The method of claim 1, further comprising:
    removing an object corresponding to the label based on the feedback; and
    removing the label from the plurality of labels when performing the modifying the label and when performing the updating the plurality of labels.

14. A non-transitory computer-readable medium having instructions stored thereon, which, when executed by a processor, cause the processor to perform a method comprising:
    identifying a plurality of features of an image;
    classifying each of the plurality of features using an artificial intelligence (AI) model trained to classify features in a plurality of images, wherein the plurality of features is classified as a plurality of labels, wherein the image is provided as input to the AI model;

determining, based on a commentary, an object within the image to which the commentary applies;

determining one or more labels of the object to which the commentary applies;

translating the commentary into feedback for the one or more labels;

modifying the one or more labels a label based on the feedback;

updating the plurality of labels with the one or more labels that is modified; and providing as input the plurality of labels that is updated into an image generation artificial intelligence system configured for implementing latent diffusion to generate an updated image.

15. The non-transitory computer-readable medium of claim 14, further comprising instructions that, when executed, cause the processor to perform the method comprising:

receiving identification of an object within a scene that is presented on a display;

presenting one or more labels of the object in a user interface via the display, wherein the one or more labels of the object includes the label; and receiving identification of the label by a user via the user interface.

16. The non-transitory computer-readable medium of claim 14, further comprising instructions that, when executed, cause the processor to perform the method comprising:

presenting a plurality of labels of a plurality of objects of a scene of the image in a user interface on a display, wherein the plurality of objects are presented in the user interface as a hierarchical file system of objects;

receiving selection of an object via the hierarchical file system;

presenting one or more labels of the object in the user interface via the display, wherein the one or more labels of the object includes the label; and receiving identification of the label by the user via the user interface.

17. The non-transitory computer-readable medium of claim 14, further comprising instructions that, when executed, cause the processor to perform the method comprising:

highlighting the object that is presented on a display.

18. A computer system comprising:

a processor; and memory coupled to the processor and having stored therein instructions that, if executed by the computer system, cause the computer system to execute a method for implementing a graphics pipeline, comprising:

identifying a plurality of features of an image;

classifying each of the plurality of features using an artificial intelligence (AI) model trained to classify features in a plurality of images, wherein the plurality of features is classified as a plurality of labels, and wherein the image is provided as input to the AI model;

determining, based on a commentary, an object within the image to which the commentary applies;

determining one or more labels of the object to which the commentary applies;

translating the commentary into feedback for the one or more labels;

modifying the one or more labels based on the feedback;

updating the plurality of labels with the one or more labels that is modified; and providing, as input, the plurality of labels that is updated into an image generation artificial intelligence system configured for implementing latent diffusion to generate an updated image.

19. The computer system of claim 18, the method further comprising:

receiving identification of an object within a scene that is presented on a display;

presenting one or more labels of the object in a user interface via the display, wherein the one or more labels of the object includes the label; and receiving identification of the label by a user via the user interface.

20. The computer system of claim 18, the method further comprising:

highlighting the object that is presented on a display.

* * * * *